United States Patent [19]

Whysong

[11] Patent Number: 4,817,742

[45] Date of Patent: Apr. 4, 1989

[54] BUTTERFLY-TYPE SHIM HAVING PERFORATIONS IN MID-SECTION THEREOF AND DOUBLE SANDWICH BRAZE JOINT PRODUCED THEREWITH

[75] Inventor: Hubert H. Whysong, Imler, Pa.

[73] Assignee: Kennametal Inc., Latrobe, Pa.

[21] Appl. No.: 245,937

[22] Filed: Sep. 16, 1988

Related U.S. Application Data

[63] Continuation of Ser. No. 84,581, Aug. 11, 1987, abandoned.

[51] Int. Cl.[4] .......................... E21B 10/58; B23C 1/04
[52] U.S. Cl. .................................. 175/410; 76/108 A;
228/122; 228/263.12
[58] Field of Search .......................... 175/410; 299/91;
228/122, 132, 133, 188, 263.12; 76/108 A

[56] References Cited

U.S. PATENT DOCUMENTS

| | | | |
|---|---|---|---|
| 1,956,233 | 4/1934 | Braun | 29/95 |
| 4,330,044 | 5/1982 | Orr et al. | 175/410 |
| 4,356,873 | 11/1982 | Dziak | 175/410 |
| 4,668,118 | 5/1987 | Bucher et al. | 403/272 |
| 4,688,652 | 8/1987 | Crist | 175/410 |

FOREIGN PATENT DOCUMENTS

| | | |
|---|---|---|
| 28706 | 3/1956 | Fed. Rep. of Germany . |
| 0227635 | 4/1941 | Switzerland .................... 79/6 |
| 0386909 | 3/1933 | United Kingdom . |
| 0664983 | 6/1952 | United Kingdom . |
| 0668810 | 9/1952 | United Kingdom . |

Primary Examiner—William P. Neuder
Attorney, Agent, or Firm—Thomas R. Trempus

[57] ABSTRACT

Formation of a double sandwich braze joint between the steel body of a bit and a carbide insert tip disposed in a groove formed across the body is facilitated by a butterfly-type shim having an array of perforations defined through its bottom wall and side walls and generally across a mid-section region of the shim. The shim also has opposite end regions where the bottom wall and side walls are solid and free of perforations. The shim side walls are disposed between the side surfaces of the bit body and insert tip and the shim bottom wall is disposed between the bottom surfaces of the bit body and insert tip such that the shim mid-section region containing the perforations is disposed adjacent central regions of the bit body and insert tip and the shim solid perforation-free opposite end regions are disposed adjacent opoposite end regions of the bit body and insert tip. The perforations of the shim mid-section region allow flow of greater amounts of braze to the corresponding adjacent central regions of the bit body and insert tip than to the opposite end regions thereof so that the double sandwich braze joint produced between the bit body, insert tip and shim is nonuniform with respect to braze thickness across the joint. The braze is thicker at the central regions of the bit body and insert tip and mid-section region of the shim and thinner at opposite end regions of the bit body, insert tip and shim.

16 Claims, 3 Drawing Sheets

BUTTERFLY-TYPE SHIM HAVING PERFORATIONS IN MID-SECTION THEREOF AND DOUBLE SANDWICH BRAZE JOINT PRODUCED THEREWITH

This is a continuation of co-pending application Ser. No. 084,581 filed on Aug. 11, 1987 now abandoned.

CROSS-REFERENCE TO RELATED APPLICATIONS

Reference is hereby made to the following copending U. S. patent applications dealing with related subject matter and assigned to the assignee of the present invention:

1. "Butterfly-Type Shim Having Semi-Opened Bottom And Double Sandwich Braze Joint Produced Therewith" by Mark S. Greenfield et al, assigned U. S. Ser. No. 024,945 and filed Mar. 12, 1987. (K-0842)

2. "Annular Shim For Construction Bit Having Multiple Perforations For Stress Relief" by Hubert H. Whysong, assigned U.S. Ser. No. 084,607 and filed Aug. 11, 1987 (K-0882)

BACKGROUND OF THE INVENTION

1. Field of the Invention

The present invention generally relates to mining and construction tools and, more particularly, is concerned with an improved butterfly-type shim having perforations through its mid-section and a double sandwich braze joint produced between a bit body and an insert tip which incorporates such shim.

2. Description of the Prior Art

Considering that thermal expansion rates of hard carbide and tungsten alloys vary from one-third to one-half that of steel, over the years brazing has proven to be an extremely successful and advantageous method of mounting carbides to steel. While it is most satisfactory when applied to small-area, short-length joints, it can also be satisfactorily applied to larger joints. However, whereas small joints are produced by relative simple, straightforward construction methods, large joints normally require more complicated methods to avoid difficulties which would otherwise be encountered in construction of the large joints.

These difficulties stem from the amount of thermal or brazing strain (or stress) created in the joined parts during formation of the braze joint. The amount of brazing strain created in small areas or short lengths of parts as a braze joint between them solidifies is usually minor and normally absorbed without materially weakening the joined parts. On longer parts or larger areas, however, the brazing strain becomes proportionately greater and can lead to considerable bending and frequently to fracture of the carbide part. Thus, more complicated methods of construction have been used heretofore to relieve brazing strains induced in carbide and steel parts by these longer or larger braze joints.

One method of construction to relieve brazing strain is to use a sandwich braze joint composed of a shim of a malleable metal, such as copper, between the carbide and steel parts. The malleable metal shim does not melt during brazing of the joint and will deform under the brazing strain without losing its bond to the steel or carbide parts, thus relieving the stress or strain to a large degree. Other methods of construction are to use a copper shim assembled between two shims of silver solder, or to use a three-ply shim composed of a layer of silver solder on either side of the copper.

One prior shim having a butterfly design has been proposed heretofore to form a double sandwich-type braze joint for mounting a carbide insert tip in an elongated groove defined in a bit body. This butterfly-type shim is generally U-shaped having upstanding side walls spaced apart and interconnected by a solid bottom wall. However, when the shim is placed in the groove between the interior bottom and opposite side surfaces of the bit body which define the groove and the exterior bottom and opposite side surfaces of the insert tip which is fitted into the groove, the respective exterior and interior surfaces on the side walls and bottom wall of the shim make flush contact with the adjacent bit body and insert tip surfaces.

Although this prior art butterfly-type shim having a solid bottom is intended to provide a double sandwich-type braze joint, the solid bottom of the shim substantially impedes the necessary distribution of molten brazing alloy across the bottom of the groove for setting up of capillary flow of the braze alloy upwardly between the adjacent surfaces of the bit body, insert tip and shim. Thus, the double sandwich joint cannot be produced effectively and consistently using this prior shim design. Formation of an incomplete and thus ineffective braze joint will limit the reliability and useful life of the tool.

Representative examples of prior art shims include those shown in U.S. Pat. Nos. (1,956,233) Braun, Orr et al (4,330,044) and Dziak (4,356,873); Swiss Patent to Braun (No. 227,635); German Patent Application to Hasewend (No. B 28706Ib/49h); and British Patents Nos. 386,909, 664,983 and 668,810. Several of these prior art shims have perforations formed through their respective wall portions and distributed uniformly across the wall portions between the opposite ends thereof. However, these shim constructions with uniformly distributed perforations, while reducing residual stresses in the joint, would result in a weakened braze joint subjecting the carbide insert tip to being broken off.

Consequently, a need exists for an improved technique to produce a more effective braze joint between the bit body and insert tip so as to provide a more durable tool having an increased useful life.

SUMMARY OF THE INVENTION

The present invention provides an improved butterfly-type shim which facilitates reliable formation of a double sandwich braze joint designed to satisfy the aforementioned needs. The improved shim of the present invention has a pair of upstanding side walls being spaced apart and interconnected at their lower edges by a bottom wall. Perforations in an array of multiple rows and columns are formed through the bottom and side walls of the shim generally along a mid-section region thereof.

When the improved shim is placed in the groove of the bit body and an insert tip is inserted in the shim for formation of a double sandwich braze joint therebetween, the array of perforations through the mid-section region of the shim allows flow of greater amounts of braze to the corresponding central region of the bit body groove and insert tip than at opposite end regions thereof. Thus, the completed braze joint is nonuniform being thickest at the central region of the bit where the stresses will be concentrated during use of the bit and need of relief by the thicker braze. At the opposite end regions of the shim where its side walls are solid and do not contain perforations, braze in lesser amounts flows there making the completed braze joint thinnest at the opposite end regions of the bit where shear strength must be greatest.

Accordingly, the present invention is directed to a butterfly-type shim for facilitating formation of a double sandwich braze joint. The shim comprises: (a) a pair of upstanding side walls; (b) a bottom wall extending in transverse relationship to, between and interconnecting, the side walls so as to dispose the side walls in spaced apart relationship to one another; and (c) means defining perforations through the bottom wall and side walls generally across a mid-section region of the shim. The shim also has opposite end regions where the bottom wall and side walls are solid and free of perforations. Preferably, the perforations are defined in the shim mid-section region in an array of multiple rows and columns thereof.

More particularly, the shim side walls each have respective forward and rearward portions. The shim bottom wall interconnects and aligns the shim side walls such that the side walls are disposed in an offset side-by-side spaced apart relationship with respect to one another. The shim side walls are overlapped at their respective rearward portions and extend in opposite directions at their respective forward portions. The mid-section region of the shim containing the perforations is the rearward portions of the shim side walls. The perforation-free opposite end regions of the shim are the forward portions of the shim side walls. Further, the shim bottom wall includes a middle portion having perforations defined therethrough, and a pair of solid opposite end portions being free of perforations.

Still further, the shim side walls have lower edges, and the shim bottom wall has opposite side portions and a main portion with a generally flat configuration extending between and interconnecting the opposite side portions. The bottom wall is connected at its opposite side portions to the lower edges of the side walls so as to dispose the lower edges of the side walls generally above the plane of the main portion of the bottom wall. Each opposite side portion of the bottom wall merges from the main portion and is upturned through approximately ninety-degrees with respect thereto. Also, the shim is preferably formed from a one-piece thin sheet of metallic material.

Further, the present invention is directed to the combination of a bit body, carbide insert tip and the above-defined butterfly-type shim. The bit body has interior opposite side surfaces and an interior bottom surface interconnecting the side surfaces to define an elongated groove across the body. The carbide insert tip has exterior opposite side surfaces and an exterior bottom surface. The insert tip is sized relative to the groove to fit within the groove in spaced relation to the corresponding side and bottom surfaces of the body defining the groove. The butterfly-type shim is disposed within the groove between the respective corresponding interior and exterior surfaces of the bit body and insert tip for facilitating formation of a double sandwich braze joint between the bit body and insert tip on opposite sides of the shim side walls.

More particularly, the shim side walls are disposed between the interior and exterior side surfaces of the bit body and insert tip, and the shim bottom wall is disposed between the interior and exterior bottom surfaces of the bit body and insert tip such that the mid-section region of the shim containing the perforations is disposed adjacent central regions of the bit body and insert tip and the solid perforation-free opposite end regions of the shim are disposed adjacent opposite end regions of the bit body and insert tip. In such arrangement, the perforations of the shim mid-section region allow flow of greater amounts of braze to the corresponding adjacent central regions of the bit body and insert tip than to the opposite end regions thereof. Thus, the double sandwich braze joint produced between the bit body, insert tip and shim is nonuniform with respect to braze thickness across the joint. The braze is thicker at the central regions of the bit body and insert tip and mid-section region of the shim and thinner at opposite end regions of the bit body, insert tip and shim.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
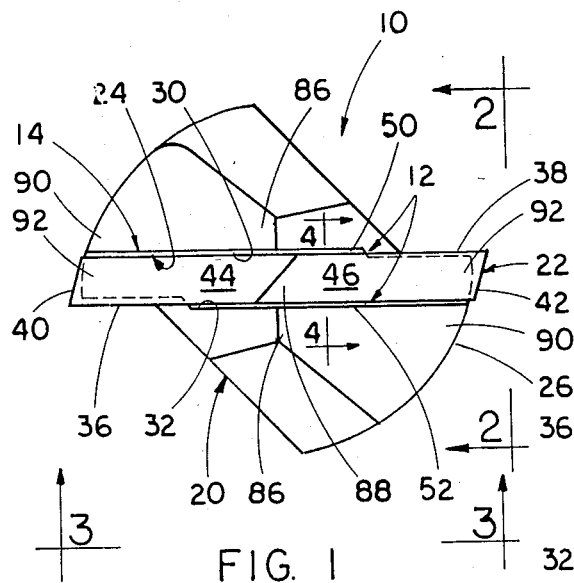
FIG. 1 is a top plan view of a double sandwich braze joint in a bit, the joint being constructed in accordance with the principles of the present invention between the body of the bit, an insert tip and a butterfly-type shim of the present invention.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Figure 11:
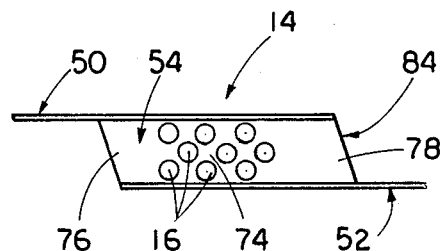
FIG. 11 is a top plan view of the shim as seen along line 11—11 of FIG. 9.
Figure 12:
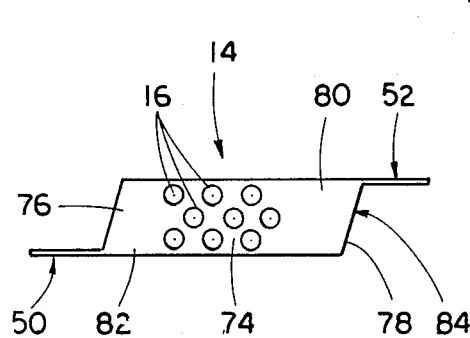
FIG. 12 is a bottom plan view of the shim as seen along line 12—12 of FIG. 9.
Figure 13:
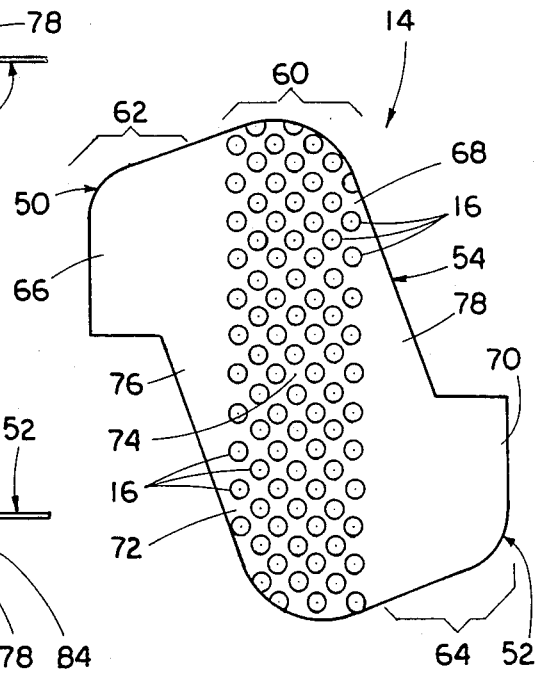
FIG. 13 is a plan view of the shim in blank form before being folded into the final shape shown in FIG. 9.

Referring now to the drawings, and particularly to FIGS. 1-4, there is shown a bit, generally designated by the numeral 10, which employs a double sandwich braze joint 12 constructed in accordance with the principles of the present invention, using a butterfly-type shim 14 having an array of perforations 16 formed through a mid-section region 18 thereof, as can be readily seen in FIGS. 11-13. The bit 10 is particularly useful in mining and construction and commonly referred to as a roof bit.

More particularly, the double sandwich braze joint 12 is formed between a body 20 of the bit 10, for example, being composed of steel, and a hard carbide insert tip 22 disposed in a slot or groove 24 defined across a forward head 26 on the body 20 (in transverse relation to a longitudinal axis A of the bit 10), with the centrally perforated shim 14 being placed within the groove 24 and interposed between respective surfaces on the bit body 20 defining the groove 24 and adjacent surfaces on the insert tip 22 which face toward the surfaces on the bit body. Basically, the bit body 20 and carbide insert tip 22 per se are conventional, whereas the shim 14 and the construction of the double sandwich braze joint 12 by use of the shim 14 with the conventional bit body 20 and insert tip 22 comprise the present invention.

Figure 5:
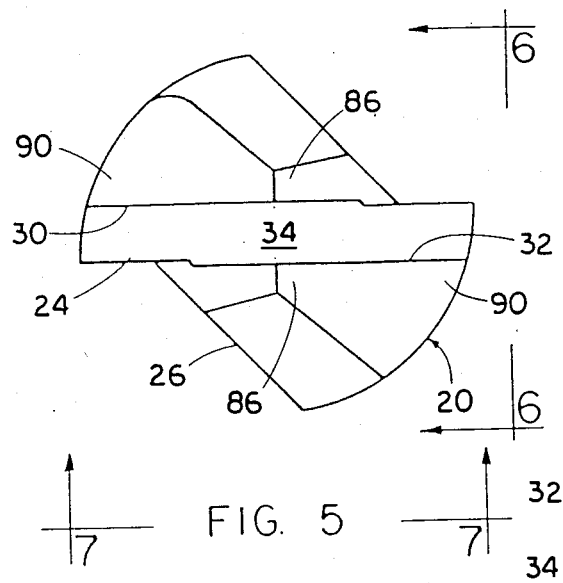
FIG. 5 is a top plan view of the bit body by itself.
Figure 6:
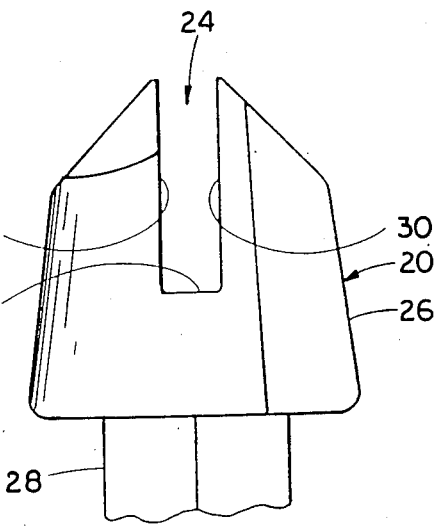
FIG. 6 is a side elevational view of the bit body as seen along line 6—6 of FIG. 5, with a lower portion of the body being broken away.
Figure 7:
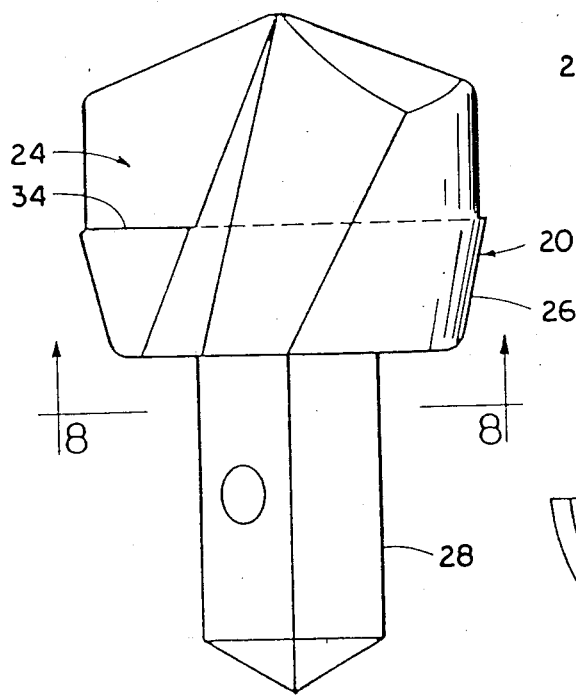
FIG. 7 is another side elevational view of the bit body as seen along line 7—7 of FIG. 5, with the bit body being rotated, approximately ninety degrees with respect to its in FIG. 6.
Figure 8:
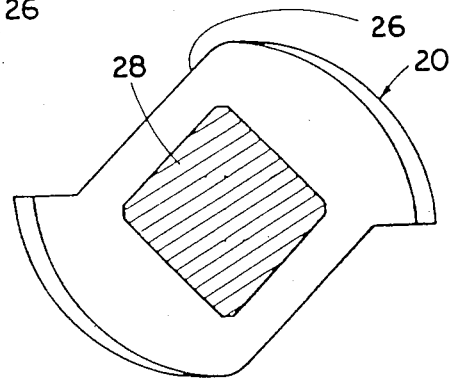
FIG. 8 is a cross-sectional view of the bit body taken along line 8—8 of FIG. 7.

Referring to FIGS. 5-8, along with FIGS. 1-4, the steel body 20 has a rearward shank 28 which supports the forward head 26 having the elongated transverse groove 24 defined thereacross. The groove 24 is defined by a pair of opposing, spaced-apart side surfaces 30,32 and a bottom surface 34 formed across the interior of the bit body head 26. The bottom surface 34 extends transverse to and interconnects the side surfaces 30,32 at their inner ends so as to define the elongated groove 24 with generally a rectangular shape in cross-section. As seen in FIG. 5, the side surfaces 30,32 of the groove 24 have offset or zigzag contours for accommodating the shim 14 therealong.

Figure 2:
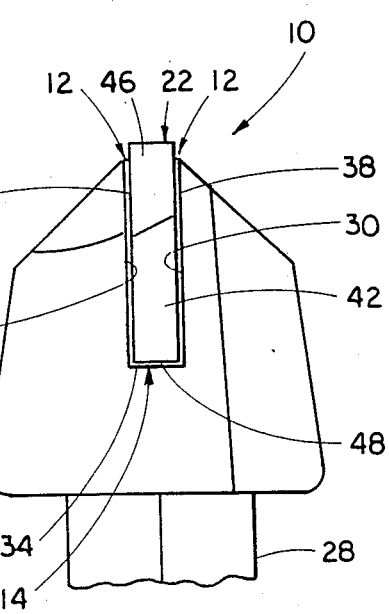
FIG. 2 is a side elevational view of the bit as seen along line 2—2 of FIG. 1, with a lower portion of the bit being broken away.
Figure 3:
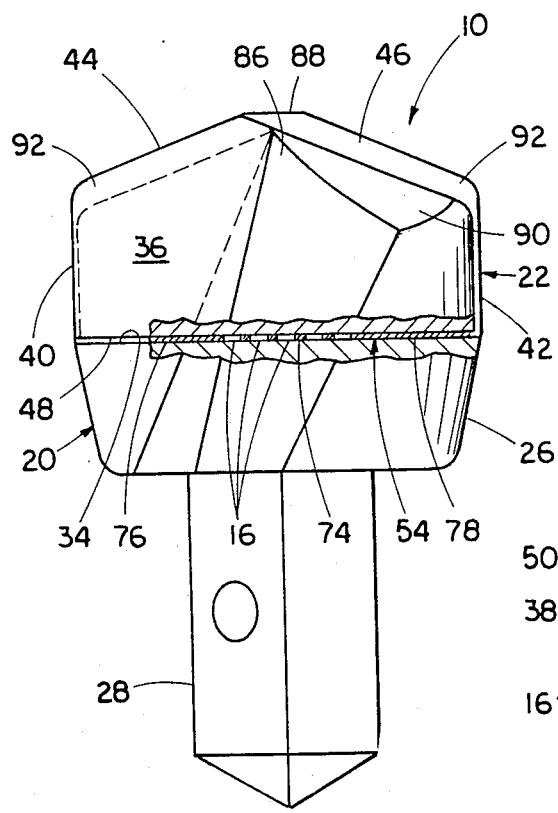
FIG. 3 is another side elevational view of the bit as seen along line 3—3 of FIG. 1, with the bit being rotated approximately ninety degrees with respect to its position in FIG. 2 and having portions broken away and sectioned to expose the bottom wall of the butterfly-type shim.
Figure 4:
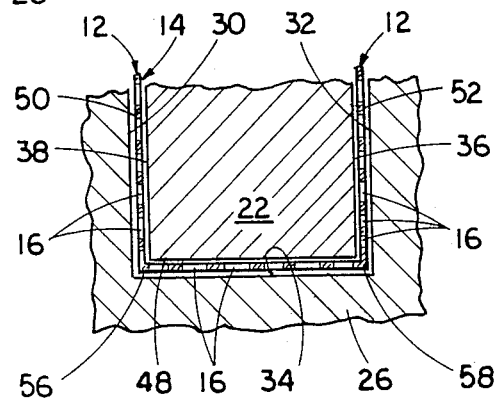
FIG. 4 is an enlarged fragmentary sectional view of the bit taken along line 4—4 of FIG. 1 showing the perforations through the bottom and side walls of the shim and with the spaces between the bit body, insert tip and shim, being exaggerated in size.

As seen in FIGS. 1-3, on its exterior the carbide insert tip 22 includes a pair of oppositely-facing, generally parallel, side surfaces 36,38; a pair of oppositely-facing, generally parallel, end surfaces 40,42; a pair of adjacent, oppositely-inclined, top surfaces 44,46 extending between and interconnecting the side and end pairs of surfaces; and a bottom surface 48 extending transversely to and interconnecting the side and end pairs of surfaces. The insert tip 22 has a generally rectangular shape in cross-section and is sized relative to the bit body groove 24 to fit within the groove in closely spaced relation to the corresponding interior side and bottom surfaces 30,32,34 of the body 16 defining the groove. In view of the zigzag contour of the groove side surfaces 30,32 and the spacing between the insert tip surfaces and the groove surfaces, the shim 14 can be disposed within the groove 24 between the respective corresponding interior and exterior surfaces of the bit body 20 and insert tip 22 for facilitating formation of a double sandwich braze joint between the bit body 20 and insert tip 22 on opposite sides of the shim 14.

Referring now to FIGS. 9-13, as well as to FIGS. 1-4, the butterfly-type shim 14 is illustrated having a pair of upstanding spaced side walls 50,52 and a bottom wall 54. The bottom wall 54 extends in transverse relation between, and integrally interconnects, the side walls 50,52 so as to dispose them between respective adjacent spaced side surfaces 30,32 and 36,38 of the bit body groove 24 and insert tip 22, with lower edges 56,58 of the respective shim side walls 50,52 disposed generally above the bottom wall 54.

As depicted in FIG. 13, the side walls 50,52 and bottom wall 54 of the shim 14 are preferably formed from a one-piece thin sheet of metallic material. Perforations 16 are punched through the side and bottom walls 50,53,54 generally across a mid-section region 60 of the shim 14. Further, the shim 14 has opposite end regions 62,64 where the side and bottom walls 50,52,54 are solid and free of perforations. Preferably, the perforations 16 are defined in the shim mid-section region 60 in an array of multiple rows and columns thereof.

More particularly, the shim side walls 50,52 each have respective forward and rearward portions 66,68 and 70,72. The shim bottom wall 54 interconnects and aligns the side walls 50,52 such that they are disposed in an offset side-by-side spaced apart relationship with respect to one another, being overlapped at their respective rearward portions 68,72 and extending in opposite directions at their respective forward portions 66,70. Also, the shim bottom wall 54 includes a middle portion 74 having perforations 16 defined therethrough, and a pair of solid opposite end portions 76,78 on either side of the middle portion being free of perforations. The mid-section region 60 of the shim 14 containing the perforations 16 encompasses the rearward portions 68,72 of the shim side walls 50,52 and the middle portion 74 of the shim bottom wall 54. The perforation-free opposite end regions 62,64 of the shim encompass the forward portions 66,70 of the shim side walls 50,52 and the opposite end portions 76,78 of the shim bottom wall 54.

Figure 9:
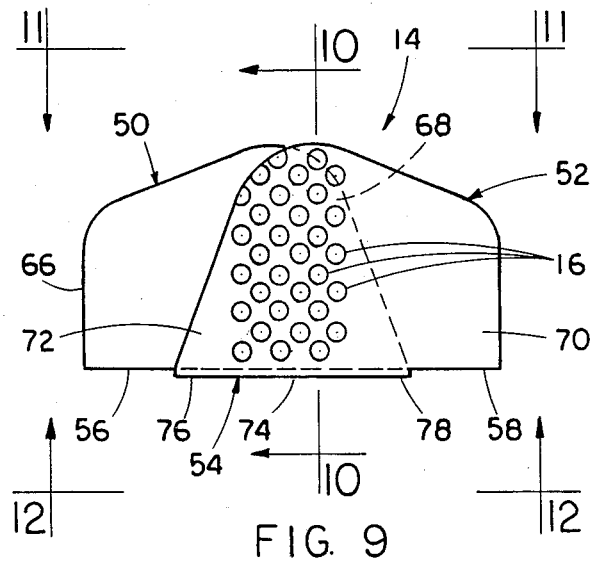
FIG. 9 is a side elevational view of the butterfly-type shim of the present invention by itself.
Figure 10:
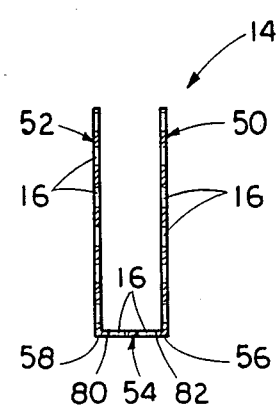
FIG. 10 is a cross-sectional view of the shim taken along line 10—10 of FIG. 9.

As shown in FIGS. 9 and 10, the bottom wall 54 of the shim 14 also has opposite side portions 80,82 and a main portion 84 with a generally flat configuration extending between and interconnecting the opposite side portions 80,82. The shim bottom wall 54 is connected at its opposite side portions 80,82 to the lower edges 56,58 of the shim side walls 50,52 so as to dispose the side wall lower edges generally above the plane of the bottom wall main portion 84. Each opposite side portion 80,82 of the bottom wall 54 merges from the main portion 84 thereof and is upturned through approximately ninety-degrees with respect thereto.

In forming the braze joint 12, a solid bar of braze alloy (not shown) will be placed in the groove 24 under the shim bottom wall 54 with the insert tip 22 placed in the shim. The assembly is then induction heated, causing the braze to flow up the side walls 50,52 of the shim 14 by capillary action.

Referring again to FIGS. 1-4, it is seen that in the braze joint 12, the shim side walls 50,52 are disposed between the interior and exterior side surfaces 30,32 and 36,38 of the bit body 20 and insert tip 22. The shim bottom wall 54 is disposed between the interior and exterior bottom surfaces 34 and 48 of the bit body 20 and insert tip 22. In such relationships, the rearward portions 68,72 of the shim side walls 50,52 and the middle portion 74 of the shim bottom wall 54 which contain the array of perforations 16 are disposed adjacent central regions 86,88 of the bit body 20 and insert tip 22, whereas the solid perforation-free forward portions 66,70 of the shim side walls 50,52 and the opposite end portions 76,78 of the shim bottom wall 54 are disposed adjacent opposite end regions 90,92 of the bit body 20 and insert tip 22. The perforations 16 allow flow of greater amounts of braze to the corresponding adjacent central regions 86,88 of the bit body 20 and insert tip 22 than to the opposite end regions 90,92 thereof so that the double sandwich braze joint 12 produced between the bit body 20, insert tip 22 and shim 14 is nonuniform with respect to braze thickness across the joint 14. The braze is thicker at the central regions 86,88 of the bit body 20 and insert tip 22 and rearward portions 68,72 of the shim side walls 50,52 and thinner at opposite end regions 90,92 of the bit body 20 and insert tip 22 and forward portions 66,70 of the shim side walls. Thus, the braze is thickest at the central region of the bit body head 26 where the stresses will be concentrated during use of the bit 10 and need relief by the thicker braze. It should also be pointed out here that the perforations 16 themselves also relieve stresses. At the opposite end regions 62,64 of the shim 14 where its side walls 50,52 are solid and do not contain perforations 16, braze in lesser amounts flows there making the completed braze joint thinnest at the opposite end regions of the bit 10 where shear strength must be greatest.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. A butterfly-type shim for facilitating formation of a double sandwich type braze joint, said shim comprising:
    (a) a pair of upstanding side walls having lower edges;
    (b) a bottom wall having opposite side portions and a main portion with a generally flat configuration extending between and interconnecting said opposite side portions, each said opposite side portion of said bottom wall merging from said main portion and being unturned through approximately ninety-degrees with respect thereto, said bottom wall being connected at its opposite side portions to said lower edges of said side walls so as to dispose said lower edges of said side walls generally above the plane of said bottom wall in spaced apart relationship to one another; and
    (c) means defining perforations through said bottom wall and side walls generally across a midsection region of said shim, said shim having opposite end regions where said bottom wall and side walls are solid and free of perforations.

2. The shim as recited in claim 1, wherein said perforations are defined in said shim mid-section region in an array of multiple rows and columns thereof.

3. The shim as recited in claim 1, wherein:
    said side walls each have respective forward and rearward portions; and
    said bottom wall interconnects and aligns said side walls such that said side walls are disposed in an offset side-by-side spaced apart relationship with respect to one another with said side walls being overlapped at their respective rearward portions and extending in opposite directions at their respective forward portions.

4. The shim as recited in claim 3, wherein:
    said mid-section region of said shim containing said perforations is said rearward portions of said side walls; and
    said perforation-free opposite end regions of said shim are said forward portions of said side walls.

5. The shim as recited in claim 1, wherein said bottom wall includes:
    a middle portion having said perforations defined therethrough; and
    a pair of solid opposite end portions being free of perforations.

6. The shim as recited in claim 1, wherein said side walls and bottom wall are formed from a one-piece thin sheet of metallic material.

7. In combination with a bit body having interior opposite side surfaces and an interior bottom surface interconnecting said side surfaces to define an elongated groove across said body and a carbide insert tip having exterior opposite side surfaces and an exterior bottom surface and being sized relative to said groove to fit within said groove in spaced relation to said corresponding side and bottom surfaces of said body defining said groove, a butterfly-type shim being disposed within said groove between said respective corresponding interior and exterior surfaces of said bit body and insert tip for facilitating formation of a double sandwich braze joint between said bit body, insert tip and shim, said shim comprising:
    (a) a pair of upstanding side walls;
    (b) a bottom wall extending in transverse relationship to, between and interconnecting, said side walls so as to dispose said side walls in spaced apart relationship to one another; and
    (c) means defining perforations through said bottom wall and side walls generally across a mid-section region of said shim, said shim having opposite end regions where said bottom wall and side walls are solid and free of perforations;
    (d) said side walls being disposed between said interior and exterior side surfaces of said bit body and insert tip and said bottom wall being disposed between said interior and exterior bottom surfaces of said bit body and insert tip such that said mid-section region of said shim containing said perforations is disposed adjacent central regions of said bit body and insert tip and said solid perforation-free opposite end regions of said shim are disposed adjacent opposite end regions of said bit body and insert tip whereby said perforations of said mid-section region of said shim allows flow of greater amounts of braze to said corresponding adjacent central regions of said bit body and insert tip than to said opposite end regions thereof so that a double sandwich braze joint produced between said bit body, insert tip and shim is nonuniform with respect to braze thickness across said joint, the braze being thicker at said central regions of said bit body and insert tip and mid-section region of said shim and thinner at opposite end regions of said bit body, insert tip and shim.

8. The shim as recited in claim 7, wherein said perforations are defined in said shim mid-section region in an array of multiple rows and columns thereof.

9. The shim as recited in claim 7, wherein:
said side walls each have respective forward and rearward portions; and
said bottom wall interconnects and aligns said side walls such that said side walls are disposed in an offset side-by-side spaced apart relationship with respect to one another with said side walls being overlapped at their respective rearward portions and extending in opposite directions at their respective forward portions.

10. The shim as recited in claim 9, wherein:
said mid-section region of said shim containing said perforations is said rearward portions of said side walls; and
said perforation-free opposite end regions of said shim are said forward portions of said side walls.

11. The shim as recited in claim 7, wherein said bottom wall includes:
a middle portion having said perforations defined therethrough; and
a pair of solid opposite end portions being free of perforations.

12. The shim as recited in claim 7, wherein:
said side walls have lower edges; and
said bottom wall has opposite side portions and a main portion with a generally flat configuration extending between and interconnecting said opposite side portions, said bottom wall being connected at its opposite side portions to said lower edges of said side walls so as to dispose said lower edges of said side walls generally above the plane of said main portion of said bottom wall.

13. The shim as recited in claim 12, wherein said each opposite side portion of said bottom wall merging from said main portion and is upturned through approximately ninety-degrees with respect thereto.

14. The shim as recited in claim 11, wherein said side walls and bottom wall are formed from a one-piece thin sheet of metallic material.

15. In combination with a bit body having interior opposite side surfaces and an interior bottom surface interconnecting said side surfaces to define an elongated groove across said body and a carbide insert tip having exterior opposite side surfaces and an exterior bottom surface and being sized relative to said groove to fit within said groove in spaced relation to said corresponding side and bottom surfaces of said body defining said groove, a butterfly-type shim being disposed within said groove between said respective corresponding interior and exterior surfaces of said bit body and insert tip for facilitating formation of a double sandwich braze joint between said bit body, insert tip and shim, said shim comprising:

(a) a pair of upstanding side walls having respective forward and rearward portions and lower edges;

(b) a bottom wall extending in transverse relationship to, between and interconnecting, said side walls at said lower edges thereof so as to align said side walls such that said side walls are disposed in an offset side-by-side spaced apart relationship with respect to one another with said side walls being overlapped at their respective rearward portions and extending in opposite directions at their respective forward portions; and (c) means defining perforations in an array of multiple rows and columns thereof across and through said bottom wall and said rearward portions of said side walls, said forward portions of said side walls being solid and free of perforations;

(d) said side walls being disposed between said interior and exterior side surfaces of said bit body and insert tip and said bottom wall being disposed between said interior and exterior bottom surfaces of said bit body and insert tip such that said rearward portions of said shim side walls containing said perforations are disposed adjacent central regions of said bit body and insert tip and said solid perforation-free forward portions of said shim side walls are disposed adjacent opposite end regions of said bit body and insert tip whereby said perforations allow flow of greater amounts of braze to said corresponding adjacent central regions of said bit body and insert tip than to said opposite end regions thereof so that a double sandwich braze joint produced between said bit body, insert tip and shim is nonuniform with respect to braze thickness across said joint, the braze being thicker at said central regions of said bit body and insert tip and rearward portions of said shim side walls and thinner at opposite end regions of said bit body, insert tip and forward portions of said shim side walls.

16. The shim as recited in claim 15, wherein said bottom wall includes:
a middle portion having said perforations defined therethrough; and
a pair of solid opposite end portions being free of perforations.

* * * * *